Aug. 6, 1940.  R. E. BISHOP  2,210,138
METHOD OF SEALING JOINTS
Filed Dec. 11, 1937

INVENTOR.
Richard E. Bishop
BY Darby & Darby
ATTORNEYS.

Patented Aug. 6, 1940

2,210,138

UNITED STATES PATENT OFFICE 2,210,138

METHOD OF SEALING JOINTS

Richard E. Bishop, South Orange, N. J., assignor to A. C. Horn & Company, Long Island City, N. Y., a corporation of New York Application December 11, 1937, Serial No. 179,377

4 Claims. (Cl. 94—18)

This invention is concerned with an improved form of filling and sealing material for cracks, gaps and openings of all kinds, and the methods of preparing the same and using it.

A general object of this invention is to provide a method of making and employing a combination of rubber and fibrous material readily adapted for the purpose of joining together working, that is, contracting and expanding parts, and for filling and sealing gaps of all kinds.

More specifically it is an object of this invention to provide a method of preparing a sealing and caulking composition which is not a solid mass but is of a cellular nature with absorbent fibres stranded together acting as an elastic cushion surrounded by a wall of rubber or similar latices, or a prevulcanized latex preferably in concentrated form, or rubber in a volatile solvent and/or various combinations thereof, in conjunction with one or more compounding ingredients.

These and other objects, as will appear from the following disclosure, are secured by means of the invention herein disclosed.

This invention resides substantially in the combination, construction, arrangement, relative location of parts, steps and series of steps, all as will be fully explained below.

In the accompanying drawing.

Figure 1:
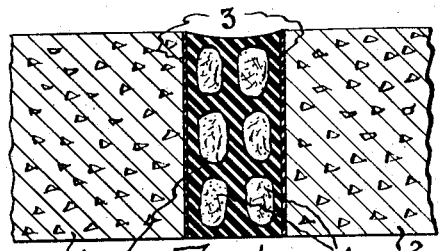
Figure 1 is a cross-sectional view through a joint sealed in accordance with this invention, such as the joint between two sections of a concrete road.

Generally speaking, for the filling, sealing and caulking of joints asphalt is used at the present time or some similar plastic which is softened by heating and poured into the joint. Such joint seals, however, are subject to serious defects as will be hereinafter explained. Likewise compositions of binding materials containing volatile solvents and in some cases inert fillers are used, the material oxidizing in the course of time. Furthermore, rubber is sometimes used for these purposes, either in the form of precast pieces or bodies, or of a mixture of materials prepared shortly before use consisting, for example, of concentrated rubber latices and a solid cementitious material such as aluminous cement and other ingredients such as inert substances, vulcanizing agents, accelerators and/or anti-oxidants. An example of an inert material sometimes used is cork powder of various sizes employed in various proportions in mixture with the rubber. An object of the use of such a composition is to produce a cheap material which is sufficiently resilient.

However, all of these forms of joint filling and sealing materials have the common defect of not forming an enduring joint and seal, especially when employed between working surfaces, that is, expanding and contracting parts, such as are represented by the adjacent sections of concrete roads. One of the reasons that these material fail is that the constant movement of the working surfaces tends to destroy the bond of the joint resulting in cracks and openings which it is the very purpose of the procedure to eliminate.

The contraction of the working surfaces takes place during lowered temperature conditions with a resultant widening of the gap or opening and therefore necessitating sufficient elasticity of the sealing or filling material to avoid breaking of its bond with the working surfaces.

It is a characteristic of the compositions referred to above, and particularly the rubber compositions, that they lose much of their elasticity during lowered temperature conditions. In other words, the material has a minimum of elasticity during that period that it needs that property most, with a resultant failure to maintain a satisfactory seal or bond. Furthermore, for many purposes, a rubber compound of any nature whatsoever which stays liquid long enough to be combined, cast and worked, does not dry, vulcanize or harden quickly enough to exercise its intended function shortly after application.

This invention is concerned with a composition and method of preparing and using it designed to overcome all of these difficulties and in addition to have advantages not present when the prior known compositions are used. In fully appreciating the true nature and scope of the invention herein disclosed, certain important considerations should be kept in mind. In the first place a bond sufficient to prevent breaking away of the sealing composition from the surface to which it is attached, does not so much depend on a definite minimum of adhesion therebetween as on the ratio of adhesion to the stress exercised on the bond or inter-faces of the sealing material and the joint or surface to which it is bonded. For example, if it is possible to elongate the joint between the two, without too greatly stressing the bond, a bond which under ordinary circumstances would not be satisfactory could be made to answer the purpose.

In accordance with this invention, the filling or sealing composition involves a compounding of latex and a fibrous material which permits of an elongation of the filling or sealing material in a crack, for example, without breaking down its bond, with the surfaces defining the crack.

For example, referring to Fig. 1, there is illustrated a crack or joint of the type which is present between the end faces of two adjacent concrete road sections which have been illustrated at 1 and 2. As is well known, the space between these sections is continually varying with changes in temperature so that during cold weather it is a maximum and during hot weather a minimum. It has been common practice to fill such joints with asphalt which in warm weather, when the crack is at a minimum, is squeezed upwardly and then mashed down by cars moving over it and gradually carried away so that in cold weather, when the crack expands, there is not sufficient asphalt present to fill it, with the result that water gets in and freezes with its well known bad effects. These difficulties are overcome with the composition of this invention.

Sometimes, instead of asphalt a combination of latex, generally in concentrated form, and a hardening and set accelerating agent, such as cement, preferably aluminous cement and/or other agents in mixture, has been employed. The walls of the road section defining the crack are cleaned and primed with rubber dissolved in a solvent or with a layer of latex concentrate and its vulcanizing and hardening agents prepared on the spot, and shortly thereafter the space between the primed walls is filled with a mixture of latex concentrate, cement and vulcanizing or hardening agents and an inert substance, such as cork powder, for example. Rubber joints of this type are elastic to a degree, particularly during moderate or warm weather. During lowered or freezing temperatures, the walls of the road section defining the crack separate sometimes as much as 50%. It then becomes necessary for the rubber joint filling to elongate or stretch with sufficient ease so that the bond between the inter-faces does not break down. However, under these conditions rubber compositions of the above nature have a minimum of elasticity and further, by reason of the nature of the compositions, tremendous forces are necessary to elongate joint filling bodies as much as 50%. Of course the whole strain of this is taken by the bonded inter-faces which frequently are not sufficiently strong to withstand it. Wherever there is a weak spot the primer tends to pull away and as soon as any breakdown occurs, it takes very little additional stress to completely pull the rest away. Frequently where the bond holds the rubber mass often splits open due to the tremendous strains therein. Either result leaves spaces which may fill with water and freeze.

Figure 2:
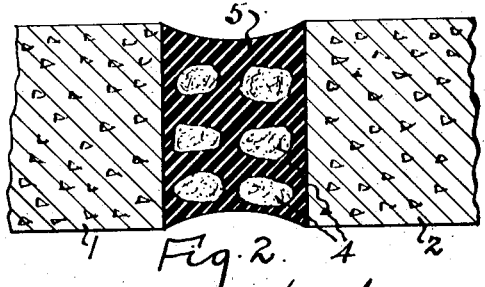
Figure 2 is a similar view of the same joint showing the conditions which exist therein upon contraction of the road sections with a resultant expansion in the joint therebetween.

These difficulties are overcome by this invention. In this invention a suitable latex concentrate, such as a latex having approximately 60% solid content, is mixed with a suitable cement, such as aluminous cement, in a suitable ratio to make a good primer such as, for example, a ratio of one to one by weight. This mixture may include other ingredients, such as vulcanizers, anti-oxidants and/or accelerators, all of which are known in the art in various forms. Instead of a primer of this nature rubber cut in organic solvents suitable for the purpose may be employed as a primer coat. If desired, to this mixture may be added a suitable vulcanizing anti-oxidant and/or accelerator. The ends of the sections 1 and 2 defining the slots to be filled are cleaned in accordance with well known practice and primed with a primer of the type described above. These priming coats have been illustrated at 3 in Fig. 1. Into the primer or similar mixture is dipped a body of suitable stranded fibrous material, as for example a loosely stranded rope made of dry hemp, jute or similar material, so that the surface thereof is thoroughly coated with the latex or rubber mixture. These ropes, strands or bodies are then employed to fill in the space between the sections up to the top or within a short distance thereof. This has been illustrated in Figure 1 wherein the space is shown filled with the fibrous strands 4 whose coatings have now all blended into a homogeneous rubber body bond and blended and joined with the primer coats which more or less lose their identity, as illustrated in Figure 2. The stranded fibrous material performs several important functions. In the first place it absorbs a portion of the liquid content of the latex or rubber mixtures, thereby causing a rapid hardening thereof and enabling the mixture to perform its full functions shortly after application. A particular advantage, therefore, of this invention is that latex of any concentration and various forms of rubber cement can be used whereas with the older methods only the most concentrated latices could be used. The less concentrated the latices used in the older methods the more cement had to be added to the mixture to absorb the liquid content thereof, such as water, and hence the harder and less resilient the resultant composition became. In accordance with this invention the liquids of the composition, such as water of the latex, is mainly taken care of or absorbed by the loosely stranded fibrous material and therefore latices of any concentration can be used, even in the absence of any cement or other inert filler. When an inert material, such as cement, is used in the composition of this invention, the quantity thereof employed is mainly determined by the length of the period of time within which it is desired that the composition sets, thus the setting time of the composition may be readily determined so as to allow sufficient time to work the material and requiring a minimum time thereafter within which to set.

Figure 2 illustrates the deformation of the filling or sealing material which takes places when the sections 1 and 2 contract and cause the joint slot to widen. The fibrous strands 4 being composed of a loosely twisted fibrous material readily change their shape when the filling material is elongated with the generation of a minimum of stress in the surrounding rubber portions 5. In other words, the fibrous bodies are easily flexed and deformed under conditions which create much smaller stresses and strains in the complete composition. This is the second important function thereof in the compositon. Conversely, under compression, the fibrous bodies are easily compacted providing adequate space for the rubber portion of the composition thereby preventing extrusion of the filling material at the top of the joint. The presence of the fibrous material also results in relatively thin sections of rubber therebetween which, of course, are more easily stretched even at low temperatures than a solid mass of rubber. Obviously the presence of the fibrous bodies reduces the strains on the bond at the interfaces between the section ends and the filling material much below the point where they would break down.

Figure 3:
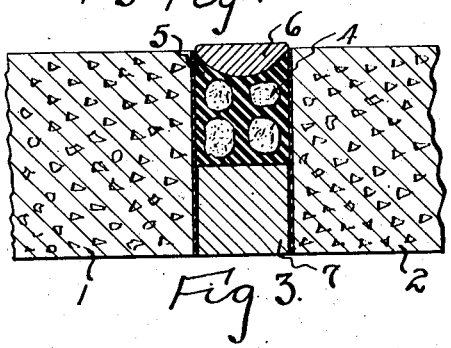
Figures 3 and 4 are, respectively, similar to Figures 1 and 2, illustrating a modified form of joint structure in accordance with this invention.

The arrangement of Figure 3 is generally similar to that of Figure 1 in that the bottom of the crack is filled with a strip of any suitable material such as wood, wood fibre, pressed asphalt compounds, and the like, as shown at 7, after the crack faces have been primed as before. The remainder of the crack is then filled with the rubber coated fibrous material described in connection with Fig. 1, up to within an inch or a half-inch of the top surface of the sections 1 and 2. The remaining space is filled with a suitable mastic, such as hot poured asphalt, an emulsion of asphalt mixed with sand or the like, as indicated at 6. In the summer time when the crack or slot is smallest due to the expansion of sections 1 and 2, the top half inch of asphalt thus extrudes above the surface. However, it is not mashed over and carried away by traffic wheels but is simply shoved back into the slot due to the flexible rubber and fibrous foundation material 5—6 thereunder. This filling material being so easily compressible and resilient, the asphalt is forced back into the crack under the downward thrust of traffic wheels.

In other places where the invention may be employed, as it may in sealing the cracks between any two bodies whether they are relatively movable or not, other strips may be employed at 7, as for example oakum, hemp, dirt, or indeed any suitable material to provide a backing or foundation to support the sealing composition of rubber and fibrous material during the hardening period. Especially where there is anticipated an excessive narrowing of the slot, extrusion may be minimized by using a resilient material such as hemp or oakum as the backing.

Figure 4:
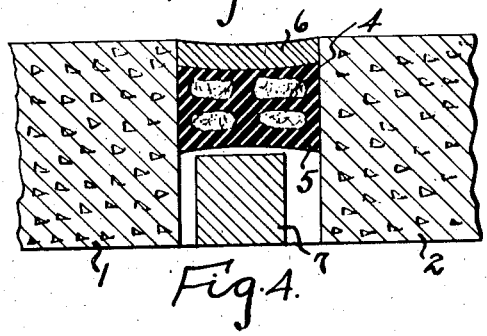

There is illustrated in Fig. 4 the conditions which obtain in a joint of this type during cold weather when the sections 1 and 2 contract. The base joint strip 7, since it is not bonded to the face of the slot, is not elongated. The opening thus caused, however, does not fill with water due to the fact that the joint remains sealed by the rubber fibrous composition, 5—4. The asphalt filler thus will assume a shape and composition as illustrated in this figure and serves to protect the rubber coated fibrous material from compression by traffic and minimizes the deterioration of the rubber portion by effectively cutting off air and sunlight.

It is, of course, apparent that in some cases the arrangement of Figs. 3 and 4 may be employed without the use of the strip 7, or, in other words, the arrangement of Figs. 1 and 2 with an asphalt capping may be employed.

It is of such importance in relationship to this invention as to bear repetition in noting that the compounds or compositions of this invention set relatively quickly by reason of the absorption of the liquid content of the rubber or latex compounds by the fibrous materials and yet does not set so fast that sufficient time is not given to permit of properly working the material. Quickly fast setting latex or rubber compositions can be prepared by using an excess of cement or various accelerators and the like but in setting they become unworkable, making it necessary to apply them rapidly. If they are made quite thin or the solvents, vulcanizers or accelerators are used in such quantities that the mixture is slow-setting, it then happens that the effectiveness of the joint or seal is destroyed because of the necessity of subjecting it to use before the rubber has set or hardened.

I readily appreciate that those skilled in the art will conceive many variations of the novel subject matter herein disclosed and I do not, therefore, desire to be strictly limited to the disclosure as given for purposes of illustration, but rather to the scope of the appended claims.

What I seek to secure by United States Letters Patent is:

1. A joint of the type described between a pair of relatively movable bodies positioned with respect to each other to form a gap, comprising a rubber composition formed in and filling said gap firmly bonded to the walls of the bodies forming the gap, and a plurality of spaced groups of loosely woven rope strands of generally circular cross-section imbedded in said composition whereby relative movement between said bodies is possible without breaking the bond with said walls by reason of the transverse flexibility of said rope strands, said rope strands undergoing transformation to elliptical forms in cross-section upon such relative movement.

2. A method of sealing a joint between two bodies which comprises coating the faces of the bodies forming the joint with a rubber base priming coat, filling the space with a liquid latex composition to a partial depth, placing loosely woven rope strands of substantial length horizontally within said space, and repeating said last two steps until the space is filled and has several layers of spaced rope strands embedded in the latex composition.

3. The method of sealing a joint between two bodies, comprising substantially filling the space between the bodies forming the joint with a liquid latex composition capable of setting, and submerging sections of loosely woven rope in said filling with the longitudinal axes of the rope sections lying substantially parallel to the longitudinal axis of the joint, the diameter of the rope sections being smaller than the width of the space between the bodies, whereby, when the filling sets, tubular chambers are formed therein containing the rope sections.

4. The method of sealing a joint between two bodies, comprising coating the faces of the bodies forming the joint with a rubber base priming coat, substantially filling the space between the bodies forming the joint with a liquid latex composition capable of setting, and submerging sections of loosely woven rope in said filling with the longitudinal axes of the rope sections lying substantially parallel to the longitudinal axis of the joint, the diameter of the rope sections being smaller than the width of the space between the bodies, whereby, when the filling sets, tubular chambers are formed therein containing the rope sections.

RICHARD E. BISHOP.